United States Patent
Krauss

(10) Patent No.: US 7,500,077 B2
(45) Date of Patent: Mar. 3, 2009

(54) USE OF REGION-ORIENTED MEMORY PROFILING TO DETECT HEAP FRAGMENTATION AND SPARSE MEMORY UTILIZATION

(75) Inventor: Kirk J. Krauss, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/164,899

(22) Filed: Dec. 9, 2005

(65) Prior Publication Data
US 2007/0136546 A1 Jun. 14, 2007

(51) Int. Cl.
G06F 12/02 (2006.01)

(52) U.S. Cl. ............... 711/170; 711/171; 711/172; 711/173; 717/128; 717/130; 717/131; 717/151; 717/158; 718/104

(58) Field of Classification Search ............... None
See application file for complete search history.

(56) References Cited

U.S. PATENT DOCUMENTS

| | | | |
|---|---|---|---|
| 5,809,554 A * | 9/1998 | Benayon et al. ............ 711/171 |
| 6,072,951 A | 6/2000 | Donovan et al. |
| 6,131,150 A * | 10/2000 | DeTreville ................. 711/173 |
| 6,334,210 B1 | 12/2001 | Miura et al. |
| 6,658,652 B1 | 12/2003 | Alexander et al. |
| 6,754,890 B1 | 6/2004 | Berry et al. |
| 6,763,440 B1 | 7/2004 | Traversat et al. |
| 2002/0099918 A1 * | 7/2002 | Avner et al. ................. 711/170 |
| 2002/0138507 A1 | 9/2002 | Shuf et al. |
| 2003/0005027 A1 | 1/2003 | Borman et al. |
| 2003/0196062 A1 * | 10/2003 | Valentin et al. ............. 711/170 |
| 2004/0078381 A1 | 4/2004 | Blandy et al. |
| 2004/0093537 A1 * | 5/2004 | Thompson et al. ............ 714/38 |
| 2004/0133759 A1 | 7/2004 | Sekiguchi |
| 2004/0158589 A1 | 8/2004 | Liang et al. |
| 2004/0162930 A1 | 8/2004 | Forin et al. |
| 2006/0206885 A1 * | 9/2006 | Seidman et al. ............ 717/148 |

OTHER PUBLICATIONS

Debugging Memory Problems using Totalview, Version 6.8 (by Etnus Inc., Apr. 2005), pp. 104.*
Benayon, Computer Method to Profile Location and Size of Heap Operations, IBM Research Disclosure, Jul. 1998, v. 41, n. 411, Article No. 411101, p. 976.

* cited by examiner

Primary Examiner—Hyung S Sough
Assistant Examiner—Kaushikkumar Patel
(74) Attorney, Agent, or Firm—Cuenot & Forsythe, L.L.C.

(57) ABSTRACT

A method of detecting inefficient use of virtual memory by an application that is programmed using memory pointers. The method can include selecting a first heap from a list of tracked heaps and identifying allocated memory blocks within the first heap. A first total can be determined as a sum of sizes of the identified memory blocks. A second total can be determined as a sum of unallocated, NULL-filled bytes within the first heap that are not located outside outermost memory block addresses in each range of committed memory in the first heap. A ratio of the first total and the second total can be determined, and a memory profile corresponding to the ratio can be generated. A memory profile suggestion also can be generated.

3 Claims, 6 Drawing Sheets

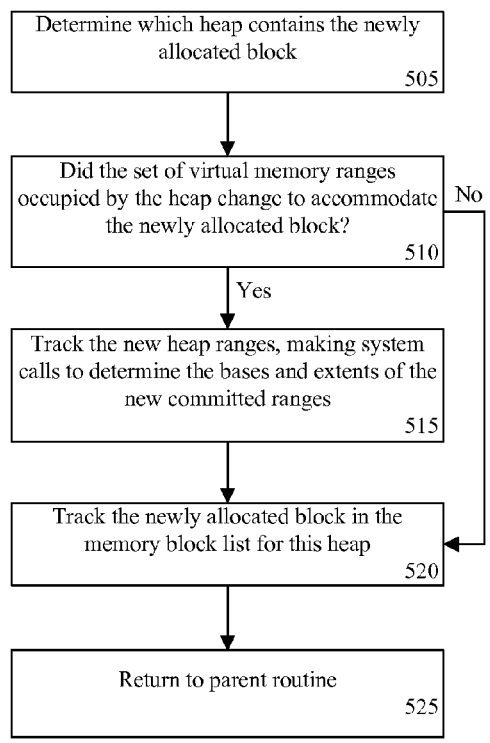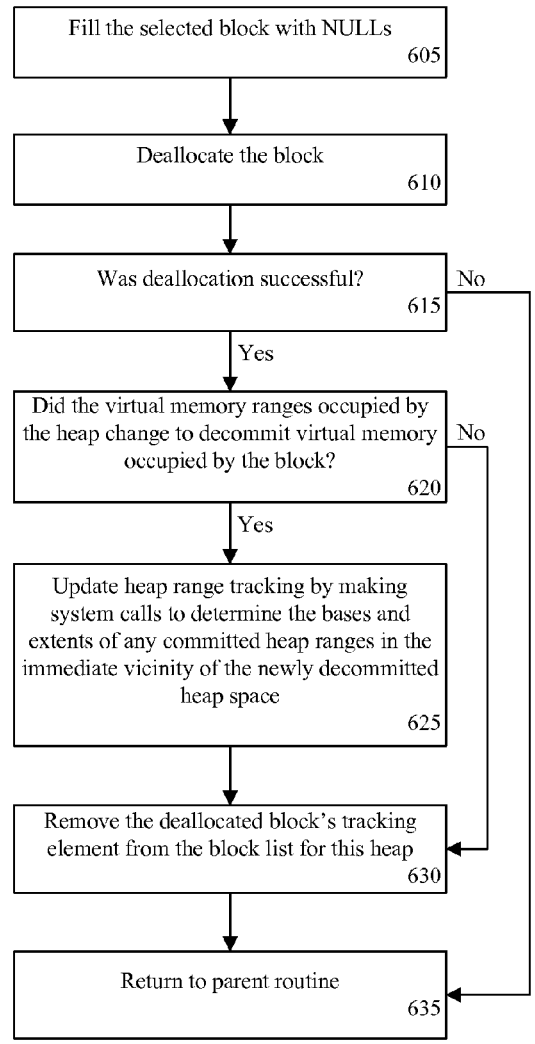
FIG. 5
FIG. 6

USE OF REGION-ORIENTED MEMORY PROFILING TO DETECT HEAP FRAGMENTATION AND SPARSE MEMORY UTILIZATION

FIELD OF THE INVENTION

The present invention relates to software development and, more particularly, to identifying inefficient use of memory.

DESCRIPTION OF THE RELATED ART

Modern computing systems utilize virtual (or logical) memory. Virtual memory is a concept that, when implemented by a computer and its operating system, maps virtual storage addresses to physical storage addresses, which generally frees software programmers from being concerned about the availability of data storage. Virtual memory also allows programmers to use a contiguous range of memory, or storage addresses for stored data, that may be larger than the amount of physical memory (RAM) available to the computer.

In addition to managing the mapping of virtual storage addresses to real storage addresses, a computer implementing virtual memory also manages storage swapping between active storage (RAM) and hard disks or other high volume storage devices. Virtual storage is typically committed in units called "pages" that form virtual memory regions ranging from a few kilobytes up to several megabytes in size. Managing storage in this manner allows multiple programs to safely run simultaneously on the computer.

In certain programming languages, including C and Pascal, heaps are used to manage allocation of virtual memory. A heap is an area of pre-reserved storage that a program process can use to store data in some calculatable amount that won't be known until the program is running. For example, a program may accept different amounts of input from one or more users for processing and then perform processing on all the input data at once. Having a certain amount of heap storage already obtained from the operating system facilitates storage management and is generally more efficient than asking the operating system for storage every time it is needed. A process manages its allocated heap by requesting heap memory blocks as needed and returning the blocks when they are no longer needed. Heaps often become fragmented, wasting memory in the virtual address space and, correspondingly, wasting space in physical memory. Heap fragmentation can also contribute to memory overhead that can result in "thrashing" and poor system wide performance in a heavily-loaded system.

With the advent of Java and managed code that incorporates garbage collecting, which reorganizes the available space in the heap and makes small unused portions of heap memory available again for large blocks, a number of memory profiling tools have been developed. These tools are used to analyze a running application and provide graphical output describing the runtime heap memory that the application is using. This output is useful to application developers who seek to tune an application's memory utilization. Purify for Java, an IBM product, is an example of one of these memory profiling tools.

Similar tools are not as available for C++ applications. Indeed, because heap fragmentation is not shown in high-level memory profile analyses, a high-level memory profiling tool like IBM Rational Purify for Java would not be especially useful for C++ developers. Moreover, C++ uses pointers, which are references to locations in virtual memory. If a heap were to be rearranged in any significant way, the pointers would need to be updateable to reflect such changes. This adds complexity to C++ code. Accordingly, C++ applications seldom perform heap compacting.

To aid developers in optimizing memory usage in C++ applications, it would be beneficial to provide a solution which can profile memory that is allocated by such applications.

SUMMARY OF THE INVENTION

The present invention provides a method and apparatus for detecting inefficient use of virtual memory by an application that is programmed using memory pointers. The method can include selecting a first heap from a list of tracked heaps and identifying allocated memory blocks within the first heap. A first total can be determined as a sum of sizes of the identified memory blocks. A second total can be determined as a sum of NULL-filled bytes within the first heap that are not located outside the outermost memory block addresses in each range of committed memory in the first heap. A ratio of the first total and the second total can be determined, and a memory profile corresponding to the ratio can be generated by assigning each of the identified, allocated memory blocks to a size category and determining, for at least one selected size category, a number of the identified, allocated memory blocks that are located next to at least one other identified, allocated memory block that is assigned to a size category other than the selected size category. The method can include generating at least one memory profile suggestion based upon the determined ratio by suggesting that the memory blocks defined in at least one of the size categories be allocated from an additional heap dedicated to blocks of a particular size category.

Another embodiment of the present invention can include a machine readable storage being programmed to cause a machine to perform the various steps described herein.

BRIEF DESCRIPTION OF THE DRAWINGS

There are shown in the drawings, embodiments which are presently preferred; it being understood, however, that the invention is not limited to the precise arrangements and instrumentalities shown.

FIG. 5 is a flowchart illustrating another aspect of low-level memory profiling in accordance with the inventive arrangements disclosed herein.

FIG. 6 is a flowchart illustrating another aspect of low-level memory profiling in accordance with the inventive arrangements disclosed herein.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a solution for detecting inefficient use of virtual memory by an application that is programmed in a language that uses memory pointers, for instance an application programmed in Pascal or one of the C family of programming languages, such as C++. The inventive arrangements disclosed herein provide a low-level memory profiling method that, during execution of the application, can be implemented to collect and analyze information relating to the application's allocation of virtual memory and to provide suggestions for improving memory usage. Accordingly, the present invention can aid a software developer in optimizing and improving computer program performance.

Figure 1:
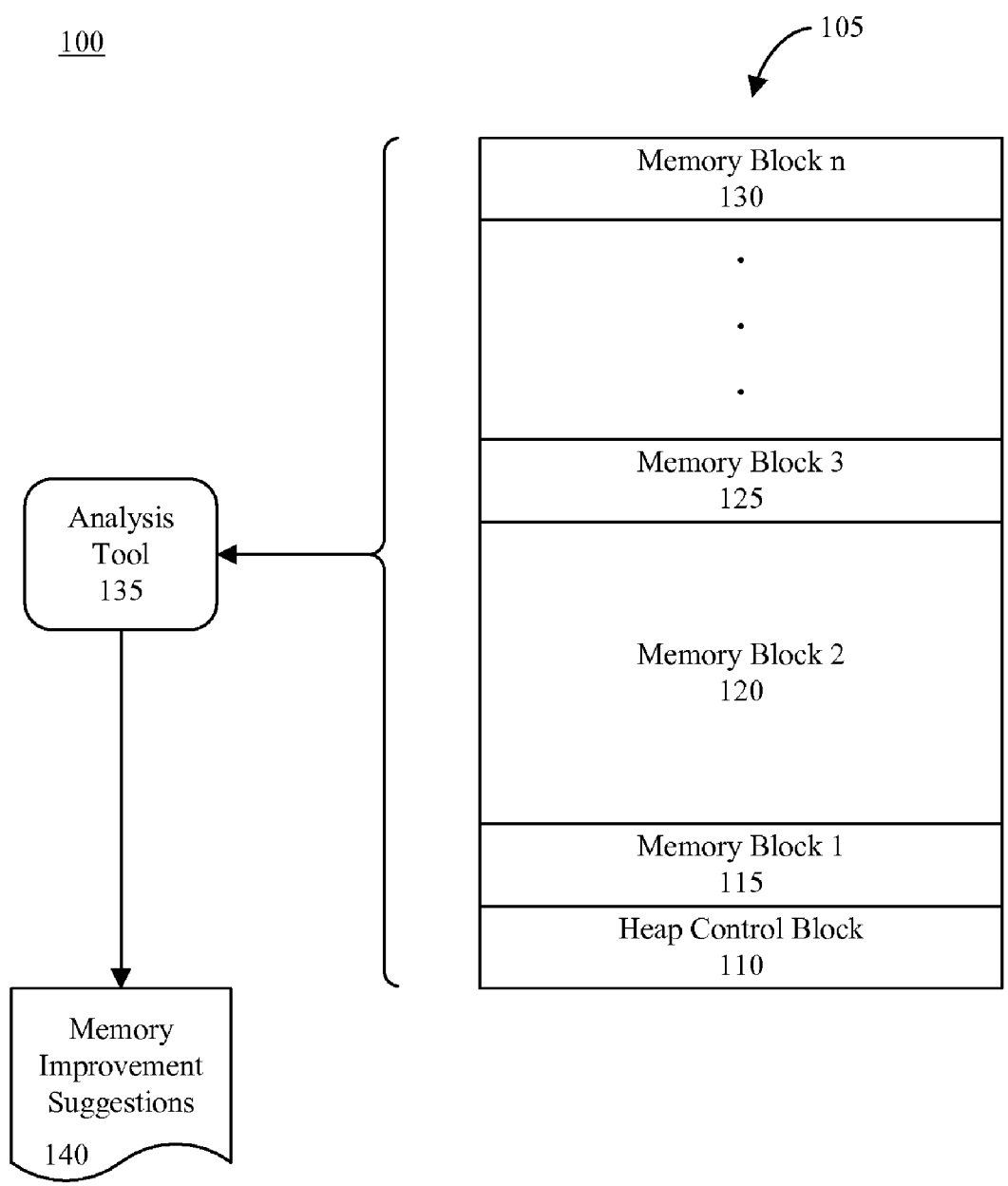
FIG. 1. is a block diagram of a system in which a low-level memory profiling method is implemented in accordance with the inventive arrangements disclosed herein.

FIG. 1 is a block diagram illustrating a system 100 in which the low-level memory profiling method can be implemented, for example during runtime analysis of application code. As used herein, runtime analysis refers to the practice of understanding program behavior using data collected during execution of an application under test. It should be appreciated that the present invention can be implemented as a standalone application, as part of a larger application, or in virtually any appropriately detailed structure, computer program, and/or portion thereof.

During execution, the application can allocate one or more heaps, such as heap 105. The heap 105 can include a heap control block 110 and memory blocks 115, 120, 125 and 130. The application can access the heap 105 through various functions such as "malloc" in the C programming language, or via other heap allocation mechanisms, and through memory read and write operations such as register load and store instructions. It should be appreciated that FIG. 1 is presented for purposes of illustration only and that the present invention is not intended to be restricted by the number of memory blocks shown. Indeed, the heap 105 can include more or fewer memory blocks than the number of memory blocks 115-130 shown.

A software analysis tool 135 can analyze the heap 105 to profile the application's memory allocations and identify inefficient use of memory and/or heap fragmentation. For example, the software analysis tool 135 can track heaps, heap memory blocks, and heap memory ranges in the virtual address space. This tracking can be updated when heap changes are detected. Such heap changes include allocation, deallocation or reallocation of memory blocks 115-130. The software analysis tool 135 also can track creation of a heap, such as heap 105, or destruction of a heap. Responsive to detecting a heap change, the software analysis tool 135 can identify the total size of space in the heap 105 that is evidently wasted.

The software analysis tool 135 can compare the total size of allocated blocks in the heap to the amount of wasted space. If the heap is highly fragmented, the software analysis tool 135 can provide suggestions 140 to reduce heap fragmentation. For instance, the software analysis tool 135 can suggest reordering heap allocations, implementing of heap compaction techniques, and/or grouping memory blocks 115-130 into heaps so that each heap contains only memory blocks of similar size. If there are one or more sparsely populated heap ranges containing only a few remaining small allocated blocks and a relatively large amount of wasted space, the software analysis tool 135 can suggest reallocating or otherwise relocating memory blocks 115-130. Further, the software analysis tool 135 can assign each of the memory blocks 115-130 to a size category and determine a number of the memory blocks 115-130 that are proximately located to memory blocks defined within a different size category. If the number of such determined blocks meets a minimum ration or threshold value, the software analysis tool 135 can suggest that the memory blocks defined in at least one of the size categories be reallocated to a second heap. The software analysis tool 135 can further indicate conditions that seem suitable for heap compaction.

FIGS. 2-9 are a series of flowcharts illustrating various aspects of low-level memory profiling in accordance with the inventive arrangements disclosed herein. As noted, the various methods disclosed herein can be implemented using a software analysis tool as previously described. Further, the methods can begin in a state where the software analysis tool has been started and is monitoring a program under test, which also is executing.

Figure 2:
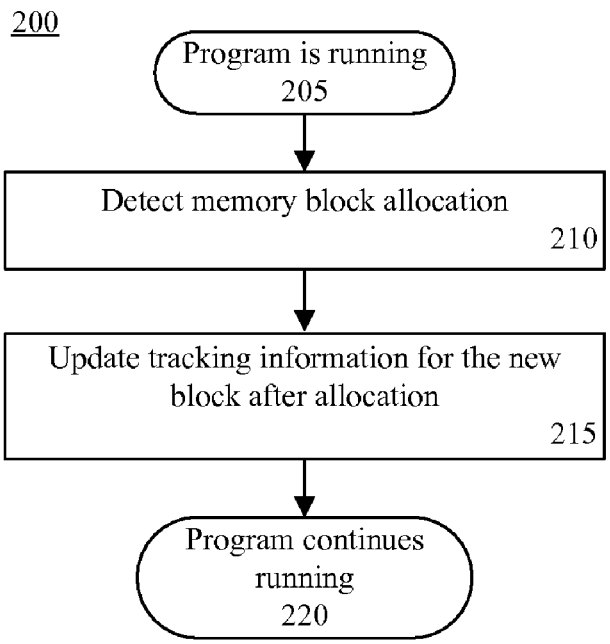
FIG. 2 is a flowchart illustrating one aspect of low-level memory profiling in accordance with the inventive arrangements disclosed herein.

Referring to FIG. 2, method 200 illustrates one technique for detecting memory block changes due to memory block allocation. Accordingly, in step 205, the software analysis tool can be executing along with the program under test. In step 210, a memory block allocation can be detected. For example, the software analysis tool can detect a call, such as malloc(), that indicates that the operating system on which the software is running is to allocate heap memory. For instance, the software analysis tool can include one or more hooks or wrappers to intercept the malloc() calls. The use of hooks and wrappers to intercept calls is known the skilled artisan and implemented in present runtime analysis tools such as IBM Rational PurifyPlus.

At step 215 the software analysis tool can update tracking information for the block that was newly allocated. A method 500 for updating tracking information after allocation of the block in accordance with one aspect of the invention is shown in FIG. 5. At step 505, the software analysis tool can determine which heap contains the newly allocated block. Referring to decision box 510, a determination can be made as to whether the set of virtual memory ranges occupied by the heap changed to accommodate the new block. If so, the new heap ranges can be tracked, as shown in step 515. For example system calls, such as calls to HeapWalk() on Microsoft Windows, can be made to determine the base and extent of the new ranges. At step 520, the newly allocated block can be tracked in the memory block list for the heap determined to contain the newly allocated block. Continuing to step 525, the process can return to step 220 of the parent routine, and the program can continue running.

Figure 3:
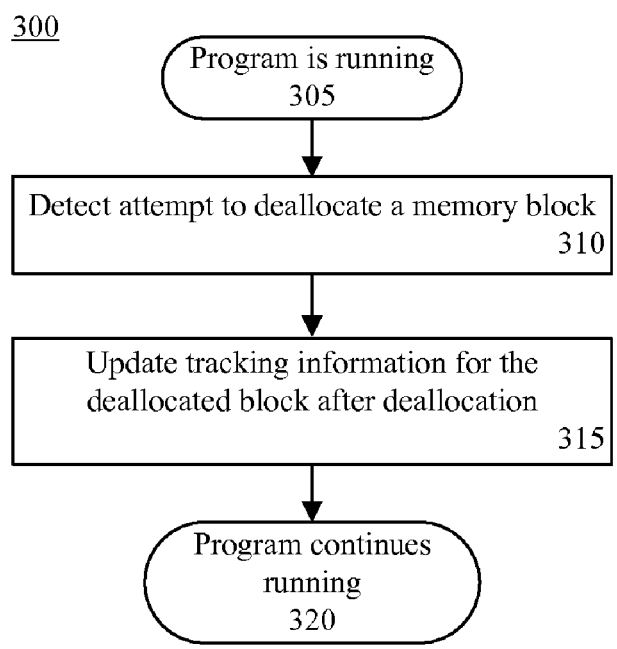
FIG. 3 is a flowchart illustrating another aspect of low-level memory profiling in accordance with the inventive arrangements disclosed herein.

Referring to FIG. 3, method 300 illustrates a technique for detecting memory block changes due to memory block deallocation. Accordingly, in step 305, the software analysis tool can be executing along with the program under test. In step 310, a memory block deallocation can be detected. For example, the software analysis tool can detect a call to a heap memory deallocation routine such as free(). Proceeding to step 315, tracking information for the block can be updated after deallocation. A method 600 for updating such tracking information is shown in FIG. 6. At step 605, the selected block can be filled with NULLs. At step 610, the block can be deallocated. Referring to decision box 615, if the deallocation was not successful, the process can proceed to step 635 and the process can return to step 320 of the parent routine, and the program can continue running.

If the deallocation was successful, the process can proceed to decision box 620, and a determination can be made as to whether the virtual memory ranges occupied by the heap changed to decommit virtual memory occupied by the block. If virtual memory ranges did change, the process can proceed to step 625. At step 625 the heap range tracking can be updated by making system calls to determine the bases and extents of any committed heap ranges in the immediate vicinity of the newly decommitted heap space. Proceeding to step 630, the deallocated block's tracking element can be removed from the block list for the heap. At step 635, the process can return to step 320 of the parent routine, and the program can continue running.

Figure 4:
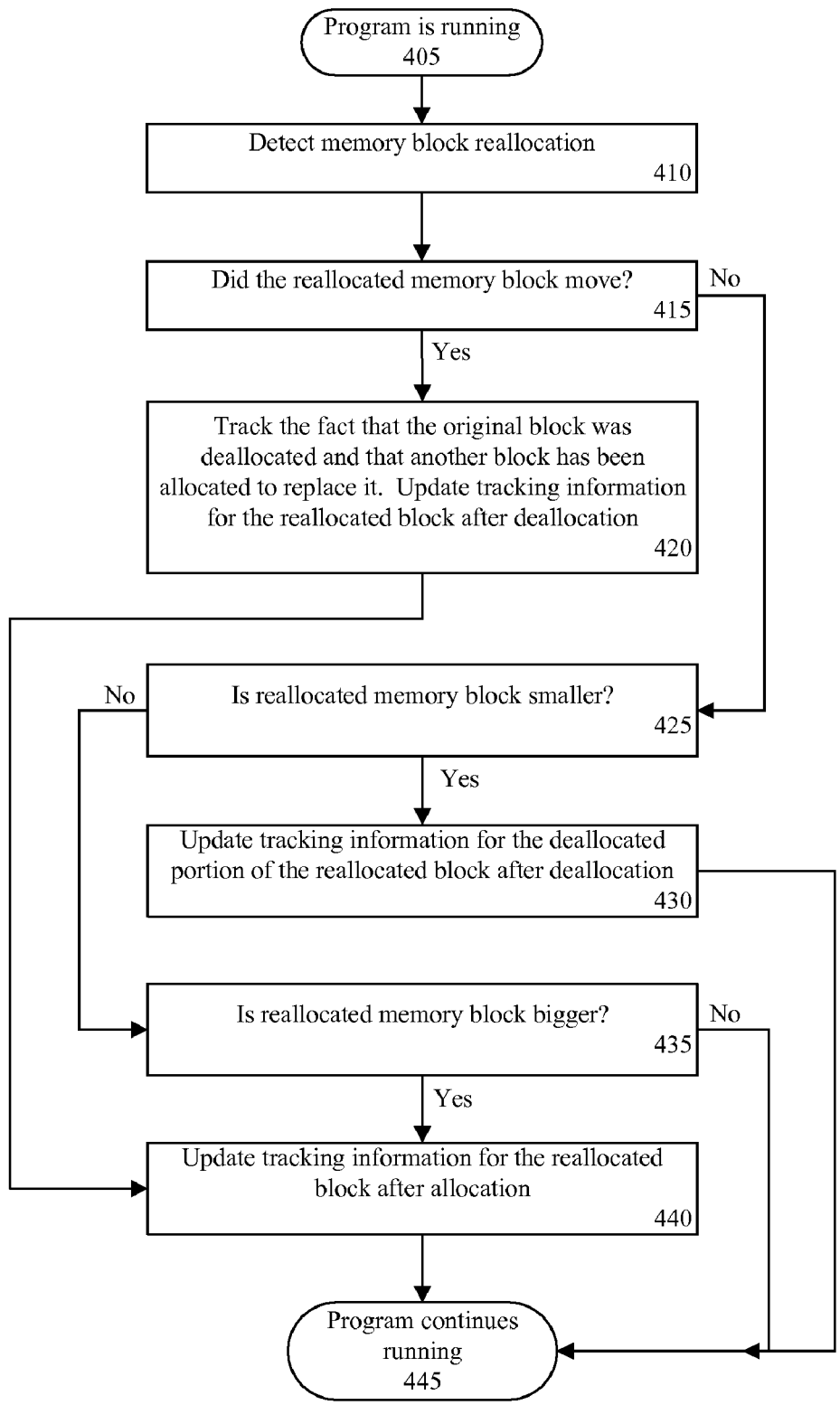
FIG. 4 is a flowchart illustrating another aspect of low-level memory profiling in accordance with the inventive arrangements disclosed herein.

Referring to FIG. 4, method 400 illustrates a technique for detecting memory block changes due to memory block reallocation. Accordingly, in step 405, the software analysis tool can be executing along with the program under test. The program under test (PUT) can be instrumented in such a way that its calls to the operating system are intercepted. For example, the PUT can intercept its own calls and forward the calls to the software analysis tool. In addition, wrappers or hooks of the software analysis tool can intercept the calls, and/or system routines can intercept the calls. Still, the calls from the PUT to the operating system can be intercepted in any other suitable manner and the invention is not limited in this regard.

In step 410, a memory block reallocation can be detected. Referring to decision box 415, a determination can be made as to whether the reallocated block moved. If the block did move, at step 420 the fact that the original block was deallocated and that another block has been allocated to replace it can be tracked. For instance, the tracking information for the memory block can be updated after the memory block is deallocated from its previous allocation. For example, the memory block can be deallocated in accordance with method 600 of FIG. 6. The process then can proceed to step 440, and the tracking information for the block can be updated after the block is allocated at its new location.

Referring again to decision box 415, if the reallocated memory block did not move the process can proceed to decision box 425 and a determination can be made as to whether the reallocated memory block became smaller. If the reallocated memory block did become smaller, the process can proceed to step 430. After allocation, tracking information for the deallocated portion of the reallocated block can be updated. At step 445 the program can continue running. If the reallocated memory block did not become smaller, the process can continue to step 435 and a determination can be made as to whether the reallocated memory block is bigger. If the reallocated memory block was made bigger, the process can proceed to step 440 where the tracking information for the block can be updated. If the reallocated block was not made bigger, the tracking information need not be updated. At step 445, the program can continue running.

Figure 7:
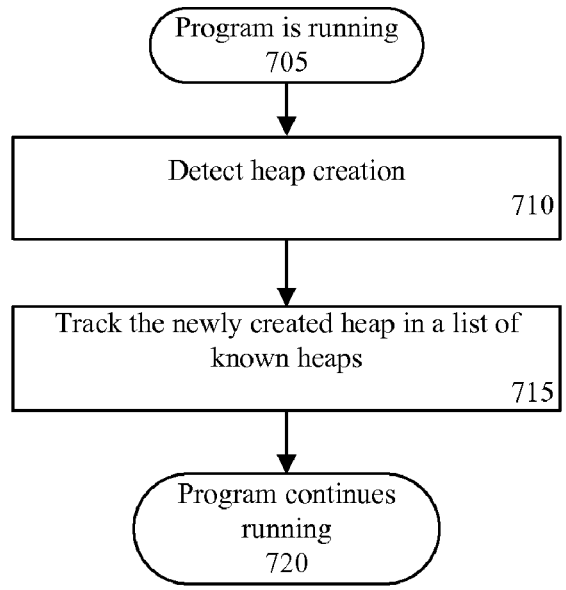
FIG. 7 is a flowchart illustrating another aspect of low-level memory profiling in accordance with the inventive arrangements disclosed herein.

FIG. 7 is a flowchart illustrating method 700, which is in accordance with another aspect of low-level memory profiling. At step 705, the software analysis tool can be executing along with the program under test. At step 710, a heap creation can be detected, for example by intercepting a HeapCreate() call on Microsoft Windows. Continuing to step 715, the newly created heap can be tracked in a list of known heaps. At step 720, the program can continue running.

Figure 8:
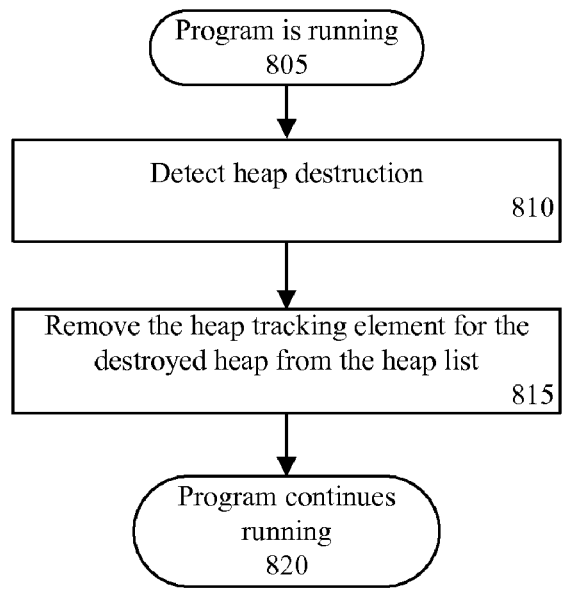
FIG. 8 is a flowchart illustrating another aspect of low-level memory profiling in accordance with the inventive arrangements disclosed herein.

FIG. 8 is a flowchart illustrating method 800, which is in accordance with yet another aspect of low-level memory profiling. At step 805, the software analysis tool can be executing along with the program under test. At step 810, destruction of a heap can be detected, for example by intercepting a HeapDestroy() call on Microsoft Windows. Proceeding to step 815, the heap tracking element from the destroyed heap can be removed from the heap list. At step 820, the program can continue running.

Figure 9:
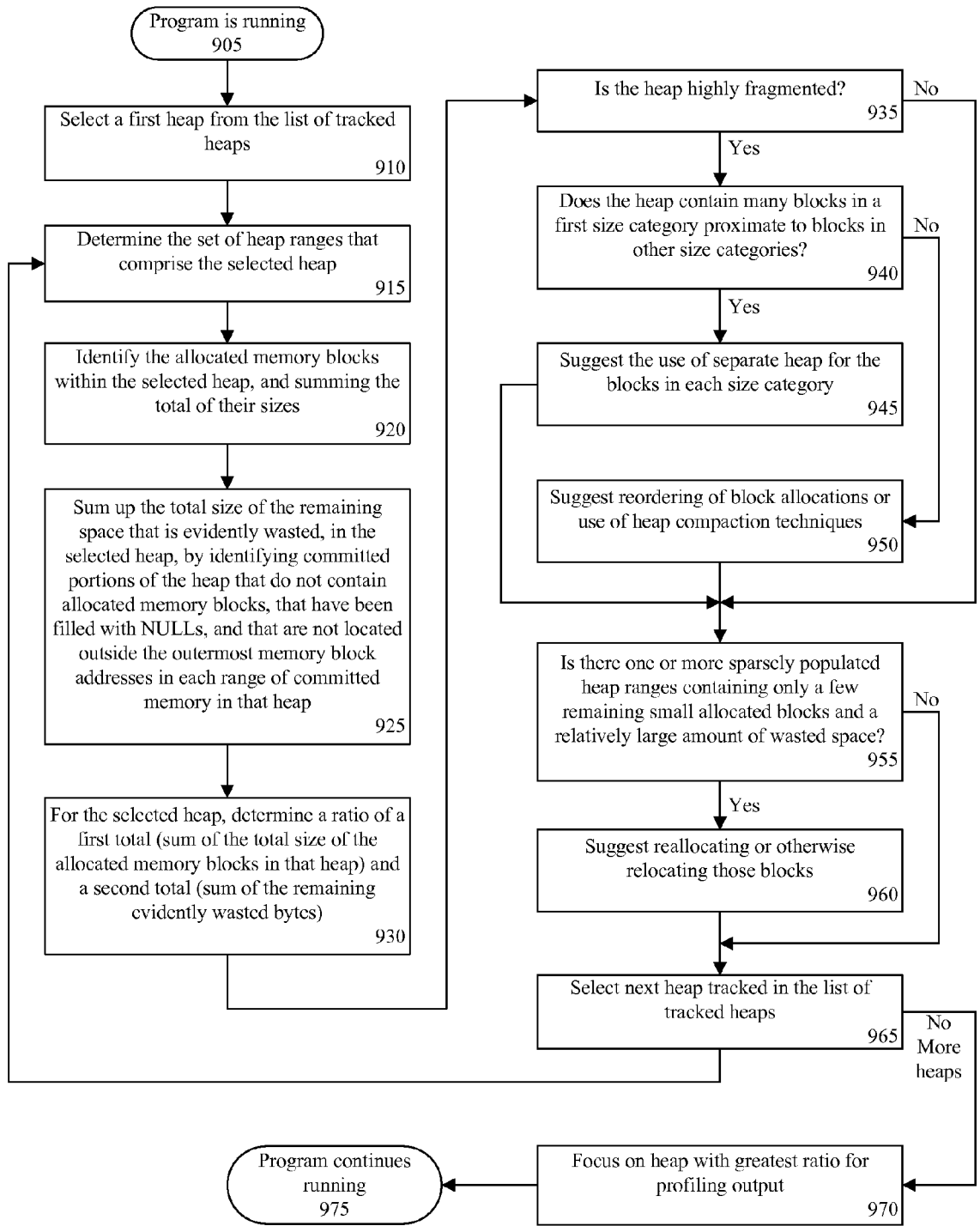
FIG. 9 is a flowchart illustrating another aspect of low-level memory profiling in accordance with the inventive arrangements disclosed herein.

Referring to FIG. 9, method 900 illustrates a process for identifying inefficient use of memory and/or heap fragmentation. Method 900 can be performed, for example, after a change in memory allocation, such as an allocation, reallocation or deallocation of a memory block, or creation or destruction of a heap. At step 905, the software analysis tool can be executing along with the program under test. At step 910, a first heap can be selected from the list of tracked heaps. Continuing to step 915, the set of heap ranges that comprise the selected heap can be determined using a suitable system call. One example of such a system call is HeapWalk(), on Microsoft Windows, although the invention is not limited in this regard and any other suitable function can be used.

At step 920, allocated memory blocks within the selected heap can be identified, and the total of their sizes can be summed. Proceeding to step 925, the total size of the remaining space that is evidently wasted in the heap can be summed. The evidently wasted space can include, for example, committed portions of the heap that do not contain allocated memory blocks, that have been filled with NULLs by an earlier invocation of step 605, and that are not located outside outermost memory block addresses in each range of committed memory in that heap. Continuing to step 930, a first total can be generated. The first total can be approximately equal to the sum of the total size of the allocated memory blocks in the selected heap. A ratio can be generated of the first total with respect to a second total. The second total can be approximately equal to the sum of the evidently wasted space generated in step 925.

Referring to decision box 935, a determination can be made as to whether the heap is highly fragmented. For instance, the generated ratio can be compared against a threshold value. If the heap is highly fragmented, the process can proceed to decision box 940 where a determination is made whether the heap contains many blocks of similar size proximate to blocks of different sizes. For example, blocks that are similar in size can be identified in size categories. A determination then can be made as to how many blocks within the heap are located proximate to blocks in other size categories. This number then can be compared to a threshold value or statistical values. Still other suitable methods can be used to determine whether there are many blocks of similar size alongside blocks of dissimilar sizes, and the invention is not limited in this regard.

If the heap is determined to be highly fragmented and it is determined to contain many blocks of similar size alongside blocks of dissimilar sizes, the process can proceed to step 945 and the software analysis tool can suggest the use of a separate heap for blocks in each size category. For instance, it can be suggested that memory blocks in at least one of the size categories be allocated from an additional heap dedicated to blocks of a particular size category. If the heap is determined to be highly fragmented, but there are not many blocks proximate to other blocks in different size categories, the process can proceed to step 950 and the software analysis tool can generate a suggestion to reorder block allocations and/or the use of heap compaction techniques, both of which can reduce heap fragmentation.

Continuing to decision box 955, a determination can be made of whether there are one or more sparsely populated heap ranges containing only a few remaining small allocated blocks and a relatively large amount of wasted space. For instance, the ratio determined in step 930 can be compared to a threshold value. If the determination is in the affirmative, the process can proceed to step 960 and the software analysis tool can generate a suggestion to reallocate or otherwise relocate the remaining blocks. The suggestions generated herein can be included in output data or an output file.

At step 965, a next heap tracked in the list of heaps can be selected. If there are no more heaps in the list, the heap with the greatest ratio, as determined in step 930, can receive focus for profiling output. For example, a call graph may be generated that is specific to a particularly fragmented or sparsely utilized heap, rather than a more general call graph reflecting all of the allocated memory in use. At step 975, the program can continue running.

It should be appreciated that the methods described herein have been provided for purposes of illustration only and are not intended to limit the present invention in any way. Further, it should be appreciated that the methods described herein can be implemented in serial and/or parallel fashion as may be required to track resource usage when a plurality of different synchronization objects are engaged.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of detecting inefficient use of virtual memory by an application that is programmed using memory pointers, said method comprising:
    selecting a first heap from a list of tracked heaps;
    identifying allocated memory blocks within the first heap;
    determining a first total as a sum of sizes of the identified, allocated memory blocks;
    determining a second total as a sum of unallocated, NULL-filled bytes within the first heap that are not located outside outermost memory block addresses in each range of committed memory in the first heap;
    determining a ratio of the first total and the second total;
    generating a memory profile corresponding to the ratio comprising assigning each of the identified, allocated memory blocks to a size category and determining, for at least one selected size category, a number of the identified, allocated memory blocks of the selected size category that are located next to at least one other identified, allocated memory block that is assigned to a size category other than the selected size category; and
    generating at least one memory profile suggestion based upon the determined ratio comprising suggesting that the memory blocks defined in at least one of the size categories be allocated from an additional heap dedicated to blocks of a particular size category.

2. The method of claim 1, further comprising comparing the determined number of memory blocks to a threshold value.

3. A machine readable storage, having stored thereon a computer program having a plurality of code sections comprising:
    code for selecting a first heap from a list of tracked heaps;
    code for identifying allocated memory blocks within the first heap;
    code for determining a first total as a sum of sizes of the identified; memory blocks;
    code for determining a second total as a sum of unallocated, NULL-filled bytes within the first heap that are not located outside outermost memory block addresses in each range of committed memory in the first heap;
    code for determining a ratio of the first total and the second total;
    code for generating a memory profile corresponding to the ratio comprising code for assigning each of the identified, allocated memory blocks to a size category and code for determining, for at least one selected size category, a number of the identified, allocated memory blocks of the selected size category that are located next to at least one other identified, allocated memory block that is assigned to a size category other than the selected size category; and
    code for generating at least one memory profile suggestion based upon the determined ratio comprising code for suggesting that the memory blocks defined in at least one of the size categories be allocated from an additional heap dedicated to blocks of a particular size category.

* * * * *